United States Patent [19]

Nitta et al.

[11] 4,002,496
[45] Jan. 11, 1977

[54] CATALYTIC DEVICE FOR STORAGE BATTERY

[75] Inventors: Hidethugu Nitta; Masaru Watanabe, both of Kyoto, Japan

[73] Assignee: Japan Storage Battery Company Ltd., Kyoto, Japan

[22] Filed: Dec. 19, 1974

[21] Appl. No.: 534,410

[52] U.S. Cl. .................................. 429/53; 429/57
[51] Int. Cl.² .................................. H01M 2/12
[58] Field of Search .......... 136/177, 179; 23/288 R

[56] References Cited

UNITED STATES PATENTS

| | | | |
|---|---|---|---|
| 2,615,062 | 10/1952 | Craig | 136/179 |
| 2,687,449 | 8/1954 | Gulick et al. | 136/179 |
| 2,835,720 | 5/1958 | Buskirk | 136/177 |
| 3,287,174 | 11/1966 | Hennigan et al. | 136/177 |
| 3,475,508 | 10/1969 | King | 23/288 R |

*Primary Examiner*—John H. Mack
*Assistant Examiner*—H. A. Feeley
*Attorney, Agent, or Firm*—Sughrue, Rothwell, Mion, Zinn & Macpeak

[57] ABSTRACT

A catalytic device for a battery containing an aqueous electrolyte into which oxygen and hydrogen gases generated as a result of a electrolysis of the aqueous electrolyte pass and are catalytically recombined into water, which returns to the electrolyte: including a catalyst body; a gas-permeable catalyst vessel having the catalyst body arranged therein; a condenser vessel housing the catalyst vessel, the condenser vessel having an opening only at the lower portion thereof; an outer vessel of the catalytic device housing the condenser vessel; and a conduit or passageway for passing a gas from the condenser vessel through a gap between the condenser vessel and the outer vessel.

9 Claims, 8 Drawing Figures

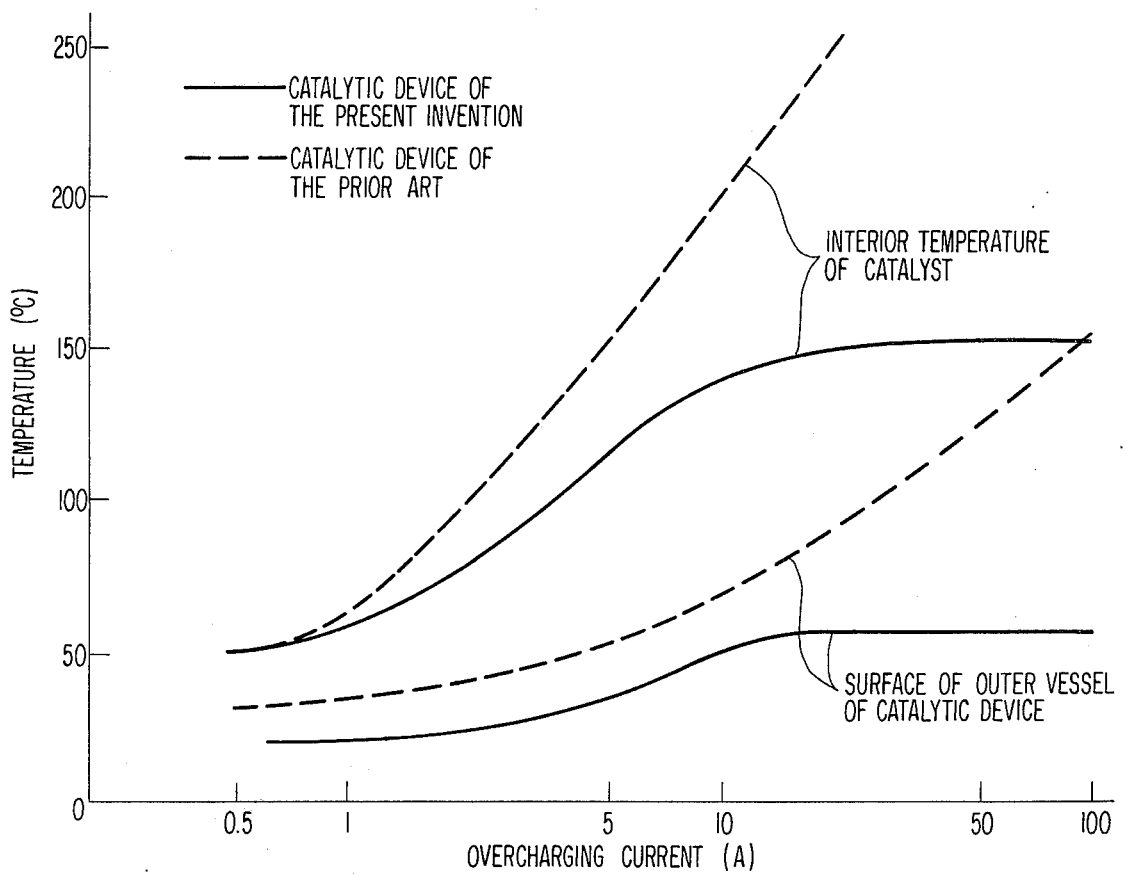
FIG. 6 RELATION BETWEEN OVERCHARGING CURRENT AND TEMPERATURE OF THE CATALYTIC DEVICE
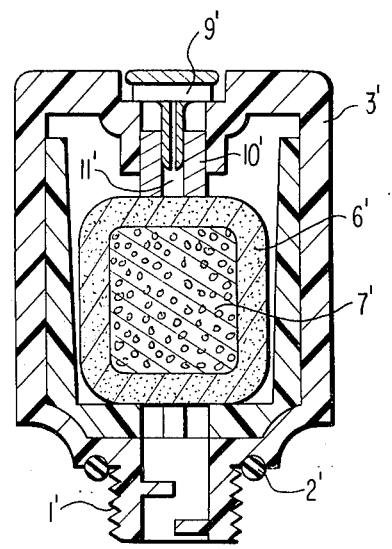
FIG. 7
PRIOR ART

4,002,496

CATALYTIC DEVICE FOR STORAGE BATTERY

BACKGROUND OF THE INVENTION

1. Field of the Invention

The present invention relates to an improvement in a catalytic device for recovering oxygen and hydrogen gases generated, e.g., during overcharging of a battery, to water by chemically recombining the gases.

2. Description of the Prior Art

When a storage battery, whose electrolyte comprises an aqueous solution, is overcharged, the water is electrolyzed oxygen gas is generated at the cathode and hydrogen gas is generated at the anode, and the quantity of the electrolyte is reduced gradually. If the battery is continued to be used as it is, the concentration of the electrolyte increases, the amount of self discharge increases and corrosion of electrode plates is accelerated until the electrode plates are exposed out of the electrolyte and the life of the battery is shortened. Accordingly, it is necessary to add water periodically to the battery, and this is cumbersome and laborconsuming as in the case with a large number of batteries or when the batteries are installed in a cabinet. In order to facilitate maintenance of the battery, a battery with a catalytic device is used as a stationary battery for an emergency power source. The device operates to recombine chemically gases generated from the battery on overcharging by means of a catalyst and reconverts the gases to water, thereby restoring the water in the electrolyte. However, with such a conventional catalytic device, a problem has been that its adaptation sufficiently to the working conditions of the battery has been impossible because the catalytic device is so constructed that all of the oxygen and hydrogen generated are reacted. Namely, since the heat of reaction produced when oxygen and hydrogen react to form water is relatively large, the catalytic device is burned out and further the battery is damaged also due to the temperature increase caused by the heat generated when the quantity of gas formed is great, that is, when the overcharge current is high. Where the temperature increase is great, the temperature of the catalyst approaches about 350° C, and sintering occurs in the catalyst. This reduces the catalytic activity so that the function of the catalytic device is destroyed. Furthermore, the steam generated must be completely permitted to be condensed by heat loss radiative. However, the temperature of the outer vessel, which is a cooling surface, increases due to the large amount of heat. This cooling is impossible and a portion of the overheated steam escapes through an exhaust port as an overflow, and it is thus difficult to incorporate batteries with a catalytic device within the cabinet. One of the causes is that the service form of batteries generally ranges from a conventional steel rack type to types where the batteries are installed in a compact form such as in a cabinet where the batteries and the charger are integrally housed. As a result, the batteries tend to be affected by the temperature rise, and the charging current tends to increase abnormally due to the temperature rise. This also happens due to faults of the charger. Furthermore, the batteries receive a periodic equalizing charge in which case there is a possibility of causing a large current to flow and overcharging, and this causes the same results.

SUMMARY OF THE INVENTION

An object of the present invention is to provide a catalytic device which is not affected by overcharging current even when the overcharging current becomes large.

The present invention aims to control the maximum level of gas reaction by introducing a rate controlling the gas reaction so that the temperature will not be increased due to occurrence of abnormal generation in the gas reaction process. The equilibrium of the gas generation and the gas reaction can be expressed as follows.

Quantity of Gas Generated = Quantity of Reacting Gas + Quantity of Escaping Unreacted Gas The maximum value of the quantity of the reacting gas can be controlled by putting the quantity of the reacting gas and the quantity of steam generated which is condensed to be equal so that the amount of condensation becomes constant.

A catalytic device for a battery containing an aqueous electrolyte into which oxygen and hydrogen gases generated as a result of a electrolysis of the aqueous electrolyte pass and are catalytically recombined into water, which returns to the electrolyte: including a catalyst body; a gas-permeable catalyst vessel having the catalyst body arranged therein; a condenser vessel housing the catalyst vessel, the condenser vessel having an opening only at the lower portion thereof; an outer vessel of the catalytic device housing the condenser vessel; and a conduit or passageway for passing a gas from the condenser vessel through a gap between the condenser vessel and the outer vessel.

BRIEF DESCRIPTION OF THE DRAWINGS

FIG. 6 shows the relationship between the overcharging current and the temperature of the catalytic device of the present invention.

FIG. 7 shows an example of a conventional catalytic device.

DETAILED DESCRIPTION OF THE INVENTION

Now the present invention will be described in detail by reference to the drawings.

Figure 1:
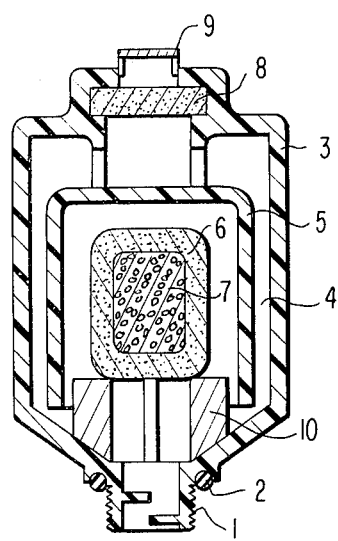
FIG. 1 shows an embodiment of the catalytic device according to the present invention.

FIG. 1 is a vertical sectional view of the catalyst device according to the present invention, in which numeral 1 designates a mounting portion for mounting the device on a filling port of the battery, which has a threaded construction. Numeral 2 denotes a packing made of an elastic material such a chloroprene rubber or the like to maintain the mounting portion in an air- and water-tight condition. Numeral 3 shows an outer vessel of the catalytic device made of, for example, an acid-resistant and alkali-resistant polypropylene resin. Numeral 4 denotes a gas passage through which a surplus of gas as an unreacted gas can pass when a large quantity of gas is introduced into the catalytic device. Numeral 5 denotes a condenser vessel opening only downwardly and is housed with an outer vessel of said catalytic device. The condenser vessel is made of, for example, an acid-resistant and alkali-resistant polypropylene resin. Numeral 6 designates a gas-permeable catalyst vessel formed by sintering heat-resistant and incombustible granules, such as alumina granules. Numeral 7 denotes a catalyst produced by impregnating an element of the platinum family such as palladium into granules obtained by sintering and forming active alumina, for example. Numeral 8 shows a filter for preventing back-fire, made of the same material as the catalyst vessel 6. All of the upper surface of the filter is covered with an inverted cup-shaped vessel. Numeral 9 is an exhaust port for preventing continuous combustion. Numeral 10 shows a protruding receiving seat to hold the catalyst vessel from below on the catalyst device, made of a material having a thermal resistance of 150° C or more.

Figure 2:
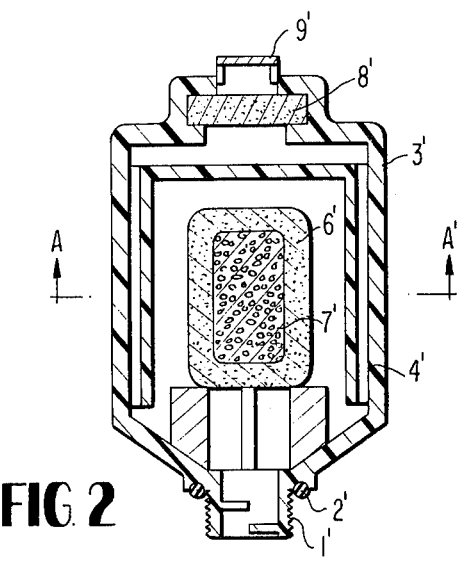
FIG. 2 shows another embodiment of the catalyst device according to the present invention.
Figure 3:
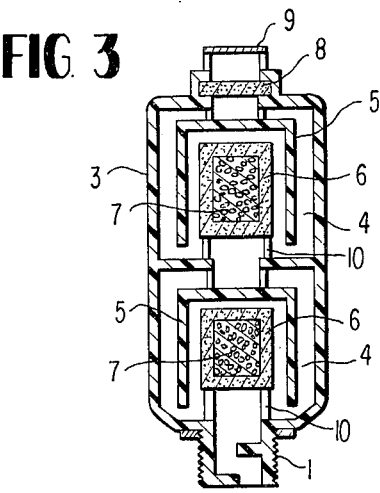
FIGS. 3, 4 and 5 show other embodiments of the catalytic device according to the present invention.
Figure 2A:
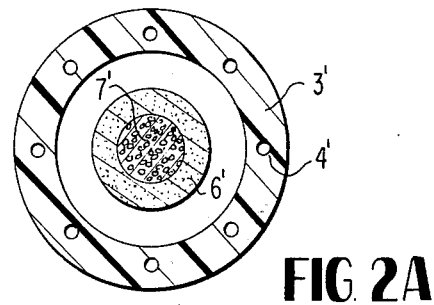
Figure 4:
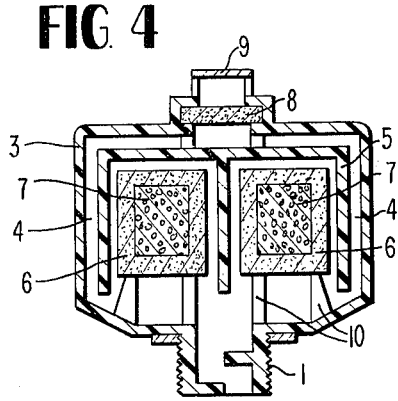
Figure 5:
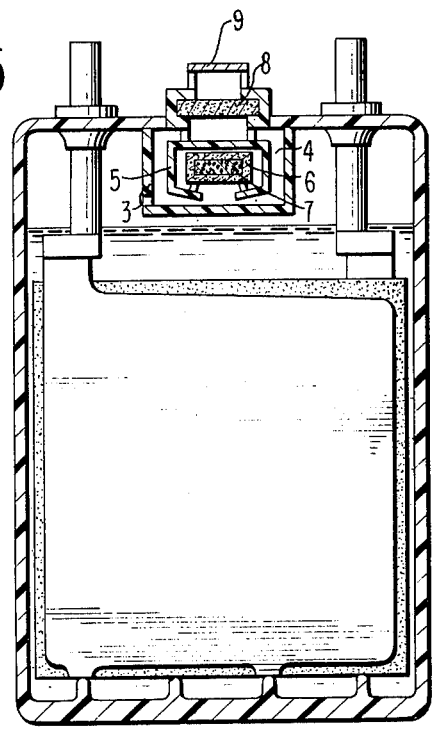

In the present invention, the outer vessel 3 and the condenser vessel 5 shown in FIG. 1 can be integrated as shown in FIG. 2. Also in the present invention, the catalytic device can also be constituted by arranging, in series or in parallel with the gas stream as shown in FIGS. 3 and 4, a plurality of basic combinations of the condenser vessel 5 shown in FIG. 1 and the catalyst body 7 disposed inside the catalyst vessel 6 in the condenser vessel 5. In the series arrangement as shown in FIG. 3, it is possible to increase the conversion efficiency of the generated gases into water, and in the parallel arrangement as shown in FIG. 4, a range of overcharge current which excludes maintenance can be increased. Furthermore, the device according to the present invention can also be arranged inside the battery as shown in FIG. 5. It is to be noted that in FIGS. 3, 4 and 5 like numerals designate similar components to those shown in FIG. 1.

A conventional catalytic device is shown in FIG. 7 in vertical section as a reference, in which 1', 2', 3', 6', 7', and 9' correspond, respectively, to each of numerals shown in FIG. 1. Numeral 10' shows a cylindrical elastic body such as rubber secured under pressure at a part of the catalyst vessel 6' in such a manner that all of the generated gas passes through the inside of catalyst body 7'. Numeral 11' shows an air vent provided for preventing breakage of the battery due to an internal pressure increase when a large quantity of gas is generated therein. With this construction, all of the gases generated flow into the catalyst body 7' through the catalyst vessel 6', and are subjected to a catalytic action, converted into water and generate heat.

The operation of the catalytic device according to the present invention will now be described referring to the example shown in FIG. 1. Oxygen and hydrogen generated from the battery by overcharge are introduced to the interior portion from the mounting portion 1. When the quantity of generated gas is small as in the case when the battery is in a floating state, the gas passes into the interior from the lower portion of the condensing vessel 5, contacts the catalyst body 7 through the minute pores in the catalyst vessel 6, is turned into steam by chemical reaction, and at the same time generates heat. The steam formed is condensed to water drops, contacting the inner surface of the condensing vessel 5, reduced of volume due to its condensation, and entrains gas anew. These processes proceed continuously. On the other hand, when an abnormally large overcharging current flows through the battery and a large quantity of gas is generated, an equilibrium is reached at a point where the quantity of condensation of the generated steam predetermined by the cooling capacity of the codndensing vessel and the quantity of gas introduced anew become equal, and a surplus of gas flows into and rises through the lower portion of the gas passage 4 provided at the periphery of the condensing vessel through a gap in the protruding receiving seat 10, passes through a backfire preventing filter 8, and escapes into the atmosphere through the exhaust port for preventing continuous combustion.

Since the catalytic device according to the present invention is thus constituted, it is not affected thermally due to the intensity of the overcharging current of the battery, so that the device can adapt sufficiently to the working conditions of the battery. Even when an abnormally large overcurrent flows through the battery and a large quantity of gas is generated due to a temperature increase of the battery or to a failure of the charger, the catalytic device is not broken by heat, and can be used in a stable manner. Thus the catalytic device of the present invention is suitable and effective for batteries, free of maintenance, and is of the type wherein a cabinet or the like is used for compactly accommodating the batteries.

What is claimed is:
1. In a catalytic device for a battery containing an aqueous electrolyte into which oxygen and hydrogen gases generated as a result of electrolysis of the aqueous electrolyte pass and are catalytically recombined into water, which returns to the electrolyte; the improvement which comprises
   a. a catalyst body;
   b. a gas-permeable catalyst vessel having said catalyst body arranged therein;
   c. a condenser vessel housing said catalyst vessel, said condenser vessel having an opening only at the lower portion thereof;
   d. an outer vessel of said catalytic device housing said condenser vessel; and
   e. means for passing a gas from said condenser vessel through a gap between said condenser vessel and said outer vessel.

2. The catalytic device as claimed in claim 1, wherein the catalyst body is arranged inside said catalyst vessel and said condenser vessel has a shape of an inverted cup, and said condenser vessel is further arranged in said outer vessel.

3. The catalytic device as claimed in claim 1, wherein a plurality of said catalyst bodies are arranged in said catalyst vessel, the gas permeability of said catalyst vessel being due to minute pores, and said catalyst vessel is disposed inside said condenser vessel which is open only at the lower portion thereof and is mounted on a seal formed with a protrusion provided at the bottom portion of said outer vessel housing said catalyst vessel.

4. The catalytic device as claimed in claim 1, including an anti-explosion mechanism containing an exhaust port for allowing the escape of a surplus of gas and covered with a filter having minute pores, and all of the upper surface of said filter is covered with an inverted cup-shaped condenser vessel, with a portion of the lateral surface thereof being made as an escape opening.

5. The catalytic device as claimed in claim 3, wherein the protrusion on which said catalyst vessel having minute pores is mounted and in which the catalyst bodies are accommodated is a material having a thermal resistance of 150° C or more.

6. The catalytic device as claimed in claim 1, wherein the bottom portion only of said catalyst vessel and accommodating said catalyst body is shielded so that the gas does not come into contact directly with the bottom portion of said catalyst vessel.

7. The catalytic device as claimed in claim 1, wherein the relative position between the condenser vessel opening only at the lower portion thereof and having the catalyst vessel which houses said catalyst body therein disposed therein and said catalyst vessel can be varied in a vertical direction.

8. The catalytic device as claimed in claim 1, wherein said condenser vessel and said outer vessel are integrally formed 9. The catalytic device as claimed in claim 1, wherein a plurality of said condenser vessels with catalyst vessels containing catalyst bodies are arranged therein and wherein a portion of the lateral surface for said condenser vessels comprises an escape opening, said catalyst vessels comprising sintered heat-resistant, incombustible granules and shielded so that said gas does not come into contact directly with the bottom portion of said catalyst vessels.

* * * * *